Jan. 25, 1944.  M. D. McCARTY  2,340,272
APPARATUS FOR RECORDING SEISMIC WAVES
Original Filed May 4, 1940
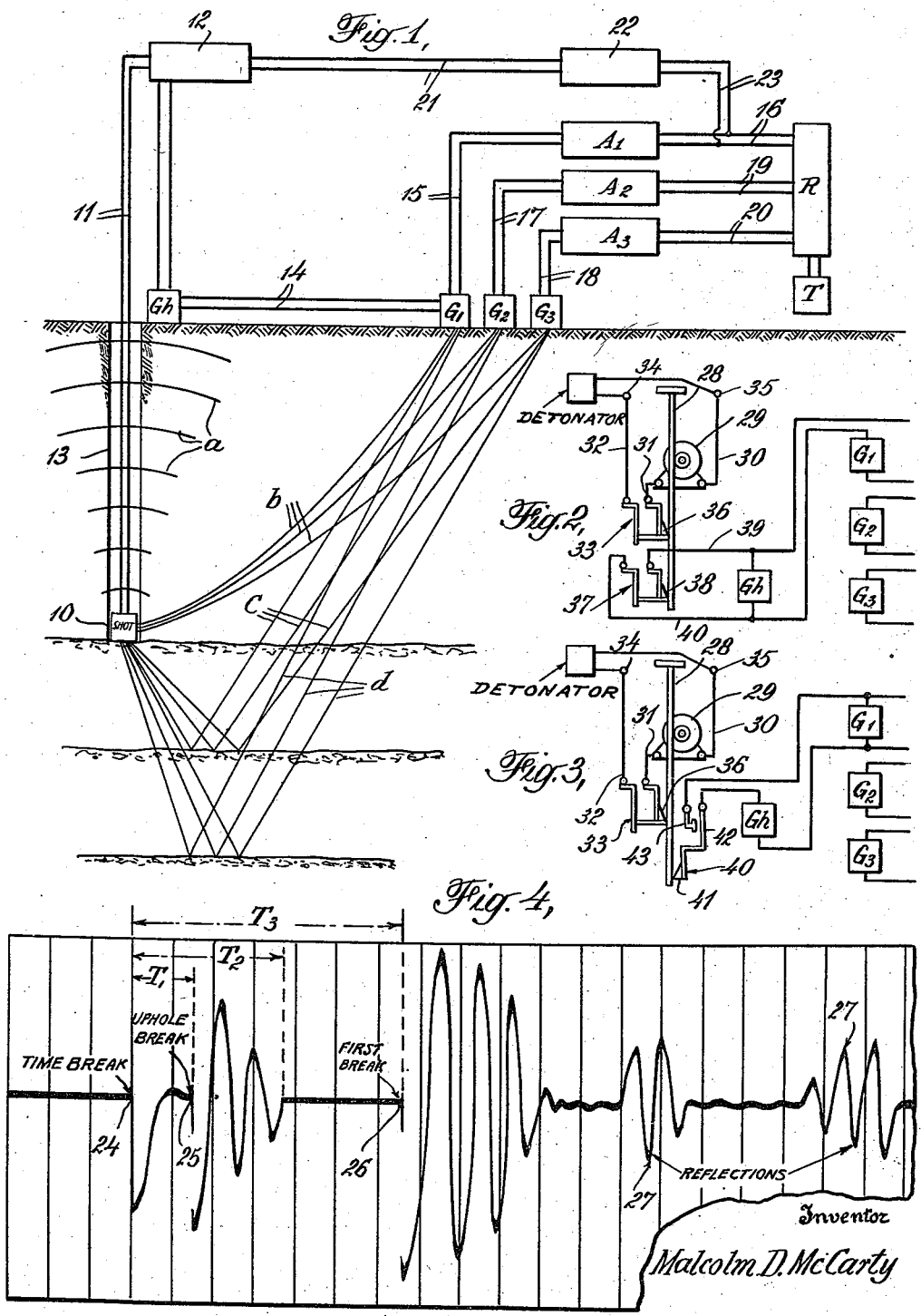

Patented Jan. 25, 1944

UNITED STATES PATENT OFFICE 2,340,272

APPARATUS FOR RECORDING SEISMIC WAVES

Malcolm D. McCarty, Dallas, Tex., assignor, by mesne assignments, to Socony-Vacuum Oil Company, Incorporated, New York, N. Y., a corporation of New York Original application May 4, 1940, Serial No. No. 333,301. Divided and this application April 30, 1941, Serial No. 391,065

3 Claims. (Cl. 177—352)

This application is a division of my copending application Serial No. 333,301, filed May 4, 1940.

This invention relates generally to apparatus for recording seismic waves and more particularly to apparatus for recording all of the desired data that has been produced by the detonation of a single charge of explosives, on a single trace of a seismogram.

In conducting geophysical surveys by seismic methods it has been the practice heretofore to record three different groups of data that are obtainable from the seismic waves generated in the earth's surface by the detonation of a charge of explosives. One of these groups comprises data composed of signals that have been generated in sympathy with the seismic waves which travel vertically upward from the explosive charge to the surface of the earth where they are detected. From this data the velocity of wave travel in the unconsolidated, uppermost strata of the earth is determinable. The second group of data comprises signals that travel directly through the unconsolidated stratum of the earth's surface to the geophones of a conventional spread. From this data the thickness of the unconsolidated weathered layer can be computed. The third group of data comprises signals which have been generated in sympathy with seismic waves which travel downwardly from the point of detonation of the explosive charge to the interfaces of subsurface strata from which they are reflected and detected at the earth's surface by the geophones in the conventional spread.

Inasmuch as all of the above mentioned data are in the form of time intervals counted from the instant of detonation of the explosive charge which creates the seismic waves, there of necessity, must be on every record an indication of the exact instant of detonation of the explosive charge. In the language of the art, this indication is known as the time break impulse.

The above described data is recorded in the form of a seismogram having a plurality of traces which have been recorded by means of a recording galvanometer on a moving photographic film or a sensitized paper. By the apparatus of the prior art, in addition to the time break impulse, there would be recorded on one of the traces a record corresponding to waves which have traveled vertically upward from the explosive charge and which have been detected by a geophone positioned adjacent the mouth of the shot hole, known in the art as the uphole geophone. Since the uphole geophone will be energized for a considerable period of time subsequent to the detection of the first waves, the trace on which its record was recorded could not be used for recording any of the other data necessary to be taken from that particular shot. Therefore, one of the vibrating elements of the recording galvanometer had to be sacrificed in order to make the record from the uphole geophone. Since only the first impulse detected by the uphole geophone is used, the remainder of this trace is useless to the interpreter. The other traces on the seismogram will have recorded on them signals generated by the geophones in the conventional spread and these signals will represent waves which have traveled directly from the shot to the geophones and waves which have traveled downwardly to the interfaces of the substrata and have been reflected back to the surface.

Since the weight and size of seismographic recording equipment limits the number of vibrating elements that it is practical to use, it is desirable to use all of the vibrating elements for recording the direct traveling waves and reflected waves. Therefore, it is the primary object of this invention to provide apparatus whereby the first impulses from the uphole geophone and all signals from one of the geophones of the conventional spread can be recorded on a single trace of a seismogram in such a manner that one group of signals will not overlap or obscure the other groups.

Another object of this invention resides in the provision of means whereby the time break impulse, first impulse detected by the uphole geophone, waves traveling directly from the shot to a geophone in the spread, and reflections from subsurface interfaces detected by the same spread geophone can all be recorded on a single trace of a seismogram without any one overlapping or obscuring the others.

Still another object of this invention resides in the provision of means for rendering the uphole geophone inoperative after the first impulses of vertically upward traveling waves have been detected, amplified and recorded.

This invention further contemplates means associated with the conventional blasting machine for rendering the uphole geophone inoperative after the vertically upward traveling waves have been detected.

Another object of this invention resides in the provision of means whereby the uphole geophone and a geophone of the conventional spread can be connected to amplifying and recording means in such a manner that the uphole geophone can be rendered inoperative after the first impulses from the vertically upward traveling waves have been detected and recorded without molesting the other geophone.

Still another object of this invention resides in the provision of means whereby the uphole geophone can be shunted a predetermined period of time after the detonation of the explosive charge, this predetermined period of time being just long enough to allow the first of the vertically upward traveling waves to reach the uphole geophone and be detected, amplified and recorded.

Other objects and advantages of the invention will be apparent from the following detailed description when considered with the drawing in which:

Figure 1 is a schematic diagram representing a seismograph operation such as that to which the present invention appertains;

Figure 2 is a circuit diagram of a modified blasting machine showing the manner in which the uphole geophone is shunted by the operation of the plunger of the blasting machine.

Figure 3 is a modification of the circuit diagram shown in Figure 2 in that it discloses means for breaking the circuit of the uphole geophone a predetermined time after closing the detonating circuit; and Figure 4 illustrates a trace of a seismogram that has been recorded in the manner taught by the present invention on which is recorded the time break impulse, the first impulses detected by the uphole geophone, the direct traveling waves that have been detected by a geophone of the conventional spread after the uphole geophone has been rendered inoperative, and subsequent reflections.

Referring to the drawing in detail particularly Figure 1, there is shown diagrammatically a complete set of seismograph equipment and a section through the earth's surface showing the disposition of the explosive and the paths traveled by the many waves that radiate therefrom. A shot or explosive charge 10 is detonated through the conductors 11 by means of the blasting machine 12. The detonation of the explosive charge 10 generates seismic waves in the earth's surface which travel outwardly from the point of disturbance in the form of a spherical wave front. Some of these waves shown at $a$ will travel vertically upward and impinge upon a geophone $G_h$ positioned adjacent the mouth of the shot hole 13. These waves impinging upon the geophone $G_h$ will generate corresponding voltage waves. These voltage waves will be transmitted through the conductors 14, the winding of geophone $G_1$ when it is connected in series with the geophone $G_h$, conductors 15 to the amplifier $A_1$ where they will be amplified and transmitted by means of the conductor 16 to the recording galvanometer R. After the first impulse, or impulses have been detected by the geophone $G_h$ the blasting machine 12 and its associated elements forming the instant invention will render this geophone inoperative and as a result no further signals after a predetermined time has elapsed will pass through the conductors 14 to be eventually recorded by the galvanometer R.

At the same time that waves $a$ are being transmitted vertically upward, other waves will be transmitted along the paths $b$ substantially directly to the geophones $G_1$, $G_2$, and $G_3$. These waves will cause these geophones to generate corresponding electrical signals which will be communicated through the conductors 15, 17, and 18 to the amplifiers $A_1$, $A_2$, and $A_3$ where they will be amplified and transmitted through the conductors 16, 19, and 20 to their respective vibrating elements in the recording galvanometer R.

Simultaneously with the generation of the waves which follow the paths indicated by $a$ and $b$, other waves will travel downwardly to strike the interfaces of substrata from which they will be reflected along the paths indicated at $c$ and $d$. These reflected waves will also be detected by geophones $G_1$, $G_2$, and $G_3$, and corresponding voltage waves will be generated. These signals in the manner described above in connection with those waves traveling vertically upward from their point of creation and those traveling directly to the geophones $G_1$, $G_2$, and $G_3$ will be amplified and recorded on the recording galvanometer R.

In order to measure the period of time required for these waves to travel from their point of creation to the geophones by the paths enumerated above means are provided in the blasting machine circuit 12 and the communication circuit, formed by the conductor 21 and the time break and communication receiving unit 22, whereby a signal indicative of the instant of detonation can be transmitted through conductors 23 to one trace of the recording galvanometer R. In addition to a signal indicative of the instant of detonation, other means must be provided producing indications of the passage of time on the seismogram. These indications are usually in the form of parallel transverse lines spaced $\frac{1}{100}$ of a second apart.

As pointed out above it is desirous to record a time break signal, an uphole geophone impulse, first breaks due to direct traveling waves and signals corresponding to waves which have traveled downward to the interfaces of the substrata and have been reflected upwardly to the surface of the earth where they are detected on a single trace of a seismogram. A trace of a seismogram illustrating such a recording is shown in Figure 4. In order to record such a trace, means are provided, as disclosed in Figures 2 and 3, for either breaking the circuit through the geophone $G_h$ or shunting it at a predetermined interval of time after the detonation of the explosive charge. The time break is shown on the trace at 24, the uphole geophone impulse at 25, the first break of direct traveling wave energy at 26 and reflections at 27. Utilizing the instant invention, it can be seen that all of the elements of a multiple element galvanometer can be used to record the reflections from independent geophones while at the same time producing an accurate record of the time break, uphole geophone impulse, and first breaks corresponding to the first energy detected of direct traveling waves.

In order to accomplish the above means are provided in conjunction with a blasting machine of the plunger type for breaking the uphole geophone circuit or placing a shunt across the uphole geophone. In Fig. 2 there is illustrated a blasting machine having a plunger 28, a generator 29, and a detonating circuit formed by the conductors 30, 31, and 32, the generator 29 and a cam operated switch 33 that is adapted to be placed by the plunger 28 when moved downwardly to drive the generator 29. The electrical detonator for the explosive charge is connected to the terminals 34 and 35. During the downward movement of the plunger 28 to drive the generator 29, the explosive charge will be detonated when the switch 33 is closed as the bottom end of the plunger passes the cam 36. The operation of the blasting machine described thus far is that of the conventional plunger type blasting machine.

The geophones $G_1$, $G_2$, and $G_3$ illustrated in Figures 1, 2 and 3 are those used in the conventional seismic reflection spread. In order to detect seismic waves such as those illustrated at $a$ in Figure 1, those waves which travel vertically upward from the shot, a geophone $G_h$ is located adjacent the mouth of the shot hole. This geophone, as shown in Figure 2, is connected in series with one of the geophones $G_1$ of the conventional spread. In Figure 3 it is shown connected in parallel with a geophone $G_1$ of the conventional spread. With the arrangements shown in Figure 2 the uphole geophone $G_h$ is operative to detect the waves which travel vertically upward from the shot at the time detonation of the shot occurs. In order to render this geophone inoperative a predetermined period of time after detonation of the explosive charge occurs a second switch 37 is provided in the blasting machine. Switch 37 is of the same type as switch 33 and is cam operated by the plunger in the same manner. This second switch is spaced sufficiently far below switch 33 that a period of time long enough for the vertically upward traveling waves to be detected by the geophone $G_h$ elapses before the bottom end of the blasting machine plunger 28 strikes the cam 38 of switch 37 to close the switch. Closing of switch 37 by the plunger as it reaches a point substantially near the end of its stroke places a shunt formed by the conductors 39 and 40 and the switch 37 directly across the geophone $G_h$ to render it inoperative. With geophone $G_h$ shunted as described above, signals generated by it subsequent to the closing of switch 37 will not be effective to disturb the seismogram trace on which the time break and uphole signals are recorded. The trace from this instant of time on is available for recording data corresponding to the first break occasioned by waves which travel directly from the shot to the geophone $G_1$ and subsequent signals generated by the geophone $G_1$ which correspond to waves which have been reflected from the interfaces of the substrata.

Another embodiment of this invention is illustrated in Figure 3. In this case a geophone $G_h$ is initially connected in parallel with the geophone $G_1$ of the conventional spread. The detonating circuit through the blasting machine is completed in the same manner as described in connection with Figure 2. In this instance, however, the plunger 28 after closing the switch 33 in the detonating circuit, on further downward movement, opens a switch 40 to break the circuit through the uphole geophone $G_h$. Switch 40 is normally closed, but as the plunger 28 reaches the point substantially near the bottom of its stroke, its contact with cam 41 causes the arm 42 of the switch 40 to move outwardly away from contact 43 to open the circuit through $G_h$ and render it inoperative. The distance between the switch 33 and switch 40 is so selected that ample time between the closing of switch 33 and the opening of switch 40 for the waves traveling vertically upward to be detected by $G_h$ will have elapsed. After the circuit through geophone $G_h$ has been broken thereby rendering it inoperative to transmit signals to the recorder only signals from the geophones $G_1$ of the conventional spread will be recorded on this trace of the seismogram.

From the above it becomes readily apparent to those skilled in the art that all the data that is necessary from a single spread when shot in one direction can be recorded on a single seismogram, thereby eliminating the necessity for recording additional shots or for using a single trace for recording no more than the uphole geophone impulse and/or the time break and uphole geophone impulse.

Referring to Figure 4 a period of elapsed time $T_1$ represents the time required for waves to travel vertically upward from the shot to the surface of the earth where they are detected by the geophone $G_h$. The period of elapsed time $T_2$ represents the interval between the closing of switch 33 and the closing of switch 37, or the opening of switch 40 as the case may be, to render the uphole geophone $G_h$ inoperative. This period of time is controllable by the vertical spacing of switches 33 and 37 or switches 33 and 40. The period of time $T_3$ represents the elapsed time between the instant of detonation and the detection of direct traveling waves such as those illustrated at $b$ in Figure 1. After the direct traveling waves have been detected by the geophone $G_1$ of the conventional spread by employing suitable expanders or automatic volume control means signals 27 corresponding to reflected waves can be recorded subsequently on the same trace or traces with usable amplitude.

It is obvious to those skilled in the art that by means of the apparatus of the instant application a record of the uphole geophone impulse can be recorded on any trace of the seismogram without interfering with the additional data that it is desired to have recorded on the particular trace.

I claim:

1. An electric seismograph comprising in combination, means for creating seismic waves in the earth at a point substantially below the surface, a conventional geophone spread, amplifiers for each of the geophones, and a multiple element recorder for recording signals generated by the geophones in the spread, an additional geophone located on the earth's surface directly above the point where the waves are created in the earth, means for recording signals generated by the last mentioned geophone on the same recorder element as signals from a geophone in the spread, means operable by an element of the blasting machine for rendering this geophone inoperative a predetermined time after the creation of the seismic waves but before seismic waves have been detected by the geophones in the spread whereby vertical wave velocity data as well as all of the data that is required from a single geophone spread when shot in one direction can be recorded on a single seismogram.

2. An electric seismograph comprising in combination, means for creating seismic waves in the earth at a point substantially below the surface, a blasting machine for detonating said means, a conventional geophone spread, amplifiers for each of the geophones and a multiple element recorder for recording signals generated by geophones in the spread, an additional geophone located on the earth's surface directly above the point where the waves are created in the earth, means for communicating signals generated by the last mentioned geophone to the multiple element recorder, means operable by an element of the blasting machine for electrically shunting this geophone a predetermined time after the creation of the seismic waves but before seismic waves have been detected by the geophones in the spread whereby signals generated by a spread geophone will not be obscured by signals generated by the geophone that is located directly above the point of creation of the seismic waves when recorded on the same trace.

3. An electric seismograph comprising in combination, means for creating seismic waves in the earth at a point substantially below the surface, a blasting machine for detonating said means, a conventional geophone spread, amplifiers for each of the geophones and a multiple element recorder for recording signals generated by geophones in the spread, an additional geophone located on the earth's surface directly above the point where the waves are created in the earth, means for communicating signals generated by the last mentioned geophone to the multiple element recorder, means operable by an element of the blasting machine for breaking a circuit through this geophone to render it inoperative a predetermined time after the creation of the seismic waves but before the detection of the seismic waves by the geophones in the spread whereby signals generated by a spread geophone will not be obscured by signals generated by the geophone that is located directly above the point of creation of the seismic waves when recorded on the same trace.

MALCOLM D. McCARTY.